(12) United States Patent
Schmalz et al.

(10) Patent No.: US 6,367,855 B1
(45) Date of Patent: Apr. 9, 2002

(54) VACUUM MANIPULATION APPARATUS

(75) Inventors: Kurt Schmalz; Wolfgang Schmalz, both of Dornstetten; Thomas Eisele, Fluorn-Winzeln, all of (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 09/590,471

(22) Filed: Jun. 9, 2000

(30) Foreign Application Priority Data

Jun. 12, 1999 (DE) .......................................... 199 28 734

(51) Int. Cl.[7] .................................................. B66C 1/02
(52) U.S. Cl. ...................................... 294/64.1; 414/627
(58) Field of Search ........................ 294/64.1, 65, 64.2, 294/64.3; 414/627, 737, 752.1; 271/94, 96, 103

(56) References Cited

U.S. PATENT DOCUMENTS

| | | | | | |
|---|---|---|---|---|---|
| 2,274,304 A | * | 2/1942 | Perry | ......................... | 294/64.1 |
| 3,602,543 A | * | 8/1971 | Einar | ......................... | 294/64.1 |
| 3,677,598 A | * | 7/1972 | Becker | ....................... | 294/64.1 |
| 3,743,340 A | * | 7/1973 | Williamann | ................ | 294/64.1 |
| 4,058,281 A | * | 11/1977 | Albert | ........................ | 294/64.1 |
| 4,266,905 A | * | 5/1981 | Birk et al. | .................. | 294/64.1 |
| 4,412,775 A | * | 11/1983 | Molitor et al. | .............. | 414/627 |
| 4,413,853 A | * | 11/1983 | Anderson | ................... | 294/64.1 |
| 4,557,659 A | * | 12/1985 | Scaglia | ....................... | 294/64.1 |
| 4,749,219 A | * | 6/1988 | Bolle, Jr. et al. | ......... | 414/752.1 |
| 5,330,314 A | * | 7/1994 | Bennison | .................... | 294/64.1 |
| 5,431,469 A | * | 7/1995 | Ohno et al. | .................. | 414/627 |
| 6,039,530 A | * | 3/2000 | Schmalz et al. | ........... | 294/64.1 |
| 6,056,500 A | * | 5/2000 | Wicen | ........................ | 294/64.1 |
| 6,131,973 A | * | 10/2000 | Trudeau et al. | ............. | 294/64.1 |
| 6,168,220 B1 | * | 1/2001 | Schmalz et al. | ........... | 294/64.1 |

FOREIGN PATENT DOCUMENTS

| | | | | | |
|---|---|---|---|---|---|
| DE | | 3934922 | * | 4/1991 | ................. 294/64.1 |
| DE | | 4229208 | * | 3/1994 | ................. 294/64.1 |
| SU | | 1036657 | * | 8/1983 | ................. 294/64.1 |

\* cited by examiner

*Primary Examiner*—Eileen D. Lillis
*Assistant Examiner*—Paul T. Chin
(74) *Attorney, Agent, or Firm*—Rader, Fishman & Grauer PLLC

(57) ABSTRACT

Vacuum manipulation apparatus includes a lifting hose coupled to a vacuum-generating unit. The lifting hose incorporates a suction gripping device having a suction end adapted for placement against an object to be grasped and lifted. The device includes a flow opening plate adapted to be opened for preventing an abrupt rise of the gripping device upon unintentional release of the grasped object against gravitational forces. In a non-grasping mode, a retractable, spring-loaded push rod extends from the suction end of the device. The push rod retracts whenever the suction gripping device engages a grasped object. A blocking arm attached to the push rod engages the flow opening plate to hold the plate normally closed during the grasping mode. When suction is broken between the grasped object and the suction end of the gripping device, the push rod extends from the device, however, opening the flow opening plate to admit airflow.

10 Claims, 2 Drawing Sheets

VACUUM MANIPULATION APPARATUS

TECHNICAL FIELD

The invention relates to a vacuum manipulation apparatus.

BACKGROUND OF THE INVENTION

The present application represents an application supplementary to German Patent Application No. 198 17 801.8-15.

From WO 96/03602, the provision of an inertial element is known, wherein, as a result of its ability to remain unchanged relative to the remaining components of the suction gripping device during a relatively rapid upward acceleration of the suction gripping device, the element exposes, either directly or indirectly, a relatively large flow opening, which leads to a rapid entry of air into the interior of the manipulation apparatus and thus to the prevention of a further abrupt rise of the suction gripping device.

Based on the foregoing, it is the object of the invention to solve the above-mentioned problem in a mechanically simple manner. In particular, for example, during the rapid lifting of relatively light objects, e.g., the inertial element is prevented from exposing in the abovementioned a flow opening, so that the vacuum present in the interior collapses. Furthermore, the arrangement of an inertial element, which either closes or opens a flow opening by itself or brings this about indirectly, is viewed as mechanically wasteful. Due to the rapid changes in movement carried out during the operation of vacuum manipulation apparatus, the arrangement of the above-described inertial element does not seem advantageous, since malfunctions as a result of rapid, jerking movements cannot be excluded.

According to one embodiment of the invention, the present task is solved wherein the means for preventing an abrupt rise are provided in that a push rod, protruding from one suction side of the suction gripping device in the unoccupied state and insertable by means of an object to be grasped, interacts with a closing device which releases or closes an additional flow cross section in the interior of the suction gripping device and of the lifting hose in such a way that when the push rod rushes in outward direction due to the release of the workpiece, the closing device releases the additional flow cross section.

DETAILED DESCRIPTION OF THE PREFERRED EMBODIMENTS

Figure 1:
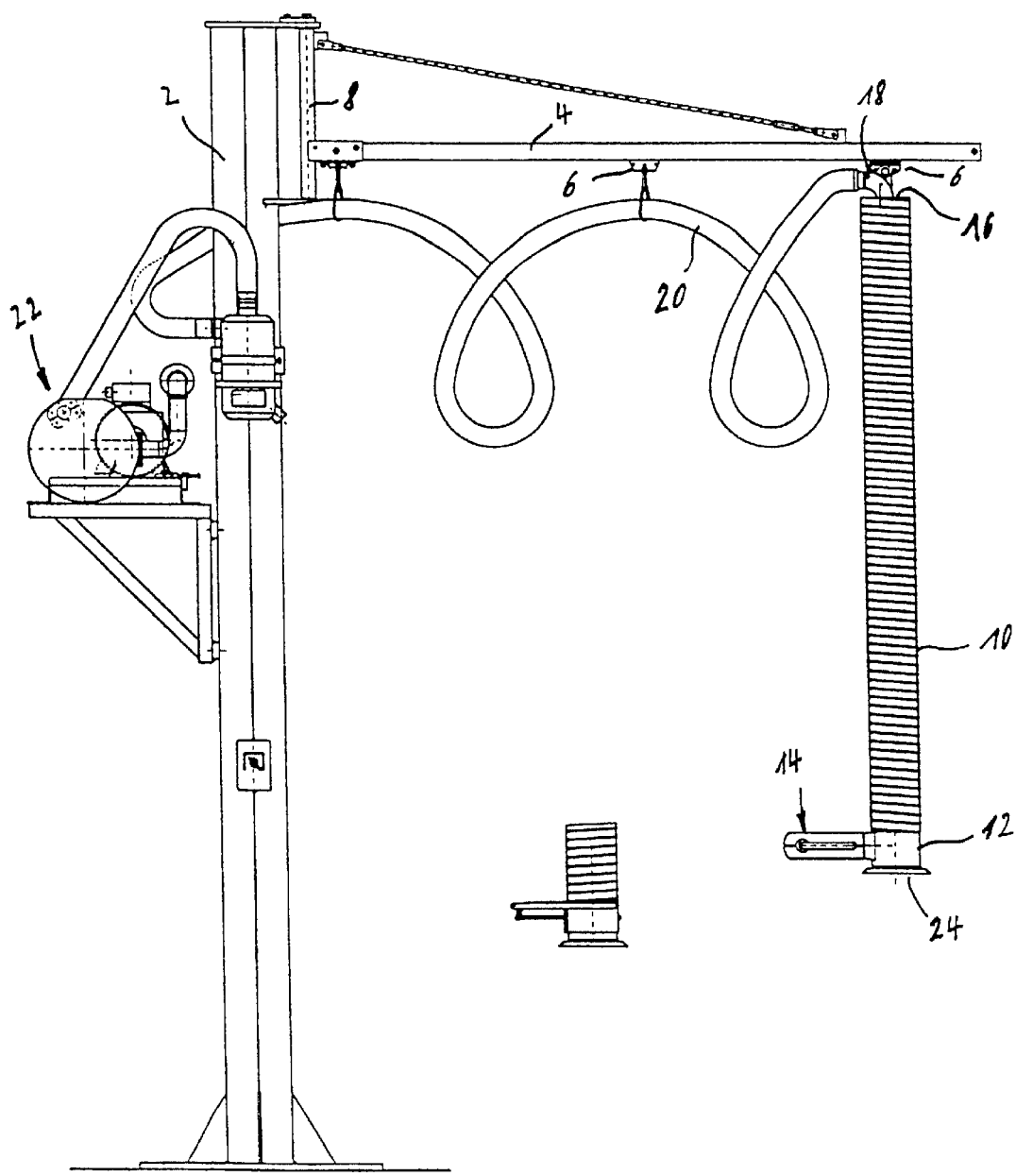
FIG. 1 shows a view of a known vacuum manipulation apparatus.

FIG. 1 shows a vacuum manipulation apparatus which is movable in the horizontal direction on a girder (4), horizontally protruding from a vertical support post, by way of slide elements (6), wherein the girder (4) itself is pivotable about a vertical axis (8). In this way, the greatest possible range of application of the vacuum manipulation apparatus is achieved. The vacuum manipulation apparatus comprises a suction gripping device (12), provided at a lower end of a lifting hose (10), with a manually graspable operating unit (14). At the upper end of the lifting hose (10), a flange plate (16), tightly sealing the lifting hose (10) and supporting it, is provided, which, at the same time, forms a rotary transmission leadthrough for a connection piece (18) which is linked to a flexible hose (20) leading to a vacuum-generating unit (22) in the form of an air suction ventilator. By way of the operating unit (14), a working opening, not shown in the figures, which forms a flow cross section between the atmosphere and the interior of the suction gripping device (12) or the lifting hose (10), is closed or more or less released in order to grasp and lift or again set down objects on one suction side (24) of the suction gripping device (12). When a grasped object is inadvertently released from the suction side (24), wherein, for example, the wall of a box breaks, a bag tears or a plate-shaped object breaks, then the suction side (24) is closed by way of known means, such as push rods or the like. The problem then arises of preventing a dangerous abrupt rise of the suction gripping device (12).

Figure 2:
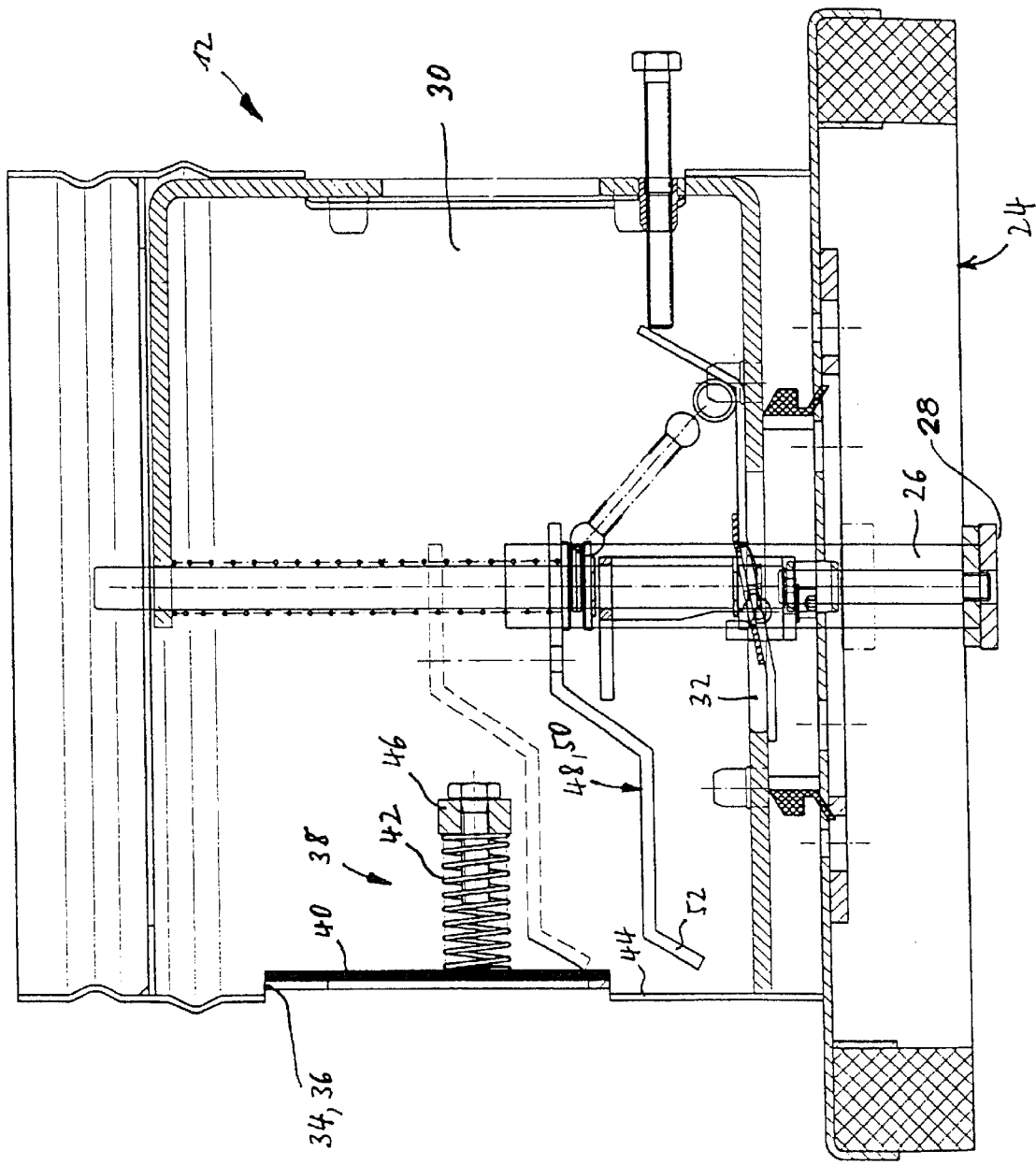
FIG. 2 shows a schematic representation of an embodiment of the vacuum manipulation apparatus of the invention.

According to the invention, shown in FIG. 2, this problem is solved. FIG. 2 shows a suction gripping device (12) above whose suction side (24) a push rod (26) protrudes during the unoccupied state of the suction gripping device (12). The push rod (26) has, in a known way, a front face (28) that can be placed on a workpiece. During its placement, the push rod (26) is slid into the interior of the suction gripping device (12). The flow communication between the interior (30) of the suction gripping device (12) and the suction side (24), occupied by an object to be grasped or to be lifted, is thus controlled to open so that the object can be grasped. This flow communication has reference numeral (32).

However, the suction gripping device has an additional relatively large opening (34) which can provide an additional flow cross section (36) into the interior (30) of the suction gripping device (12). This opening (34) can be closed by a closing arrangement that has the general reference numeral (38). In the case shown, the closing arrangement (38) comprises a plate (40), which under the effect of a compression spring (42) is pressed from the inside against a wall (44) of the suction gripping device (12). The spring tension of the compression spring (42) can be preset via adjustment means (46). It is set so that in the unoccupied state of the suction gripping device (12), while taking into consideration the suction output of a vacuum-generating unit, the relatively large flow opening (34) is continuously or intermittently exposed in such a way that the vacuum in the interior (30) of the suction gripping device (12) will not drop below a certain value, and in this way, an abrupt rise of the suction gripping device is prevented. In this way, a suspended state of the suction gripping device (12) at a certain height can be set.

According to the invention, the push rod (26) interacts with the closing arrangement (38) in such a way that the closing arrangement (38), during the regular lifting operation, does not open even in the presence of maximum vacuum in the interior (30) of the suction gripping device (12), yet, as the push rod rushes toward the outside due to the release of a workpiece, the closing arrangement (38) suddenly exposes the additional flow cross section (36), so that air can flow into the interior (30) of the suction gripping device (12) and an abrupt rise of the suction gripping device (12) is safely prevented. This is achieved in that the push rod is connected to a mechanically acting blocking element (48) in the form of a blocking arm (50), which, together with the push rod (26) in the interior (30) of the suction gripping device (12), is displaceable in such a way that, when the push rod is extended toward the outside (unoccupied state), the suction gripping device releases the closing device (38) or the plate (40), so that they can open when a predetermined vacuum is reached, and that during the retracted state of the push rod (26) (occupied state, working position), safely prevents the closing arrangement (38) from opening.

The blocking arm (50) comprises an at least somewhat yielding section (52) that can be placed against the inside of the plate (40) while applying a yielding pressure.

What is claimed is:

1. A vacuum manipulation apparatus, comprising:
   a lifting hose adapted to be connected to a vacuum-generating unit,
   a suction gripping device having a suction end adaptable for placement against an object to be manipulated, wherein said device is adapted to grasp said object,
   said gripping device comprising a flow opening plate adapted to be opened for preventing an abrupt rise of the suction gripping device upon an unintentional release of the grasped object, said apparatus further including
   a push rod extending from said suction end of the suction gripping device in a non-grasping state, and being retracted within the suction gripping device by said grasped object while said object is being grasped,
   a closing arrangement for opening or closing said plate to provide air flow into the interior of the suction gripping device and the lifting hose,
   wherein the push rod interacts with said closing arrangement in such a way that when the push rod extends from said suction end of said suction gripping device upon release of a grasped object, the closing arrangement opens said plate and admits said air flow.

2. Vacuum manipulation apparatus in accordance with claim 1, wherein the closing arrangement is pre-tensioned in the direction of closing.

3. Vacuum manipulation apparatus in accordance with claim 2 wherein the pre-tensioning is adjustable.

4. Vacuum manipulation apparatus in accordance with claim 1, wherein the closing arrangement includes a plate pre-tensioned against the inside against a wall of the vacuum manipulation apparatus in a sealing manner.

5. Vacuum manipulation apparatus in accordance with claim 1, wherein the plate is pressed against the wall by the effect of a compression spring.

6. Vacuum manipulation apparatus in accordance with claim 1, wherein the push rod is effectively connected to a mechanically operating blocking element which prevents the closing arrangement from releasing when the push rod is in its retracted position.

7. Vacuum manipulation apparatus in accordance with claim 6, wherein the mechanically operating blocking element is a blocking arm, displaceable by the push rod, which is moved with the push rod between a blocking position and a release position of the closing arrangement.

8. Vacuum manipulation apparatus in accordance with claim 6, wherein the blocking element has at least a partially yielding section which is placed in a pre-tensioned state against the closing arrangement when the push rod is in the retracted state.

9. A vacuum manipulation apparatus comprising:
   a lifting hose adapted to be connected to a vacuum-generating unit;
   a suction gripping device having a suction side for grasping an object to be manipulated;
   a closeable air flow plate for admitting airflow into the interior of the suction gripping device and the suction hose;
   a closing arrangement for opening and closing said air flow plate;
   a push rod operably connected to the closing arrangement, the push rod having a first position when the suction gripping device is not grasping an object, and a second position when the suction gripping device is grasping an object;
   wherein the air flow plate is closed, and the closing arrangement is prevented from opening the plate when the push rod is in the second position, and wherein the closing arrangement opens said plate when the push rod is in said first position.

10. The vacuum manipulation apparatus as claimed in claim 9, wherein:
    in said first position, a portion of push rod is extended from the suction end of the suction gripping device; and
    in said second position, said portion is retracted into the suction end of the suction gripping device by the object to be manipulated.

* * * * *